(12) United States Patent
Chen et al.

(10) Patent No.: US 9,178,575 B2
(45) Date of Patent: Nov. 3, 2015

(54) SYSTEM AND METHOD FOR IMPLEMENTING POWER DISTRIBUTION

(75) Inventors: Wei-Peng Chen, Fremont, CA (US);
Chenxi Zhu, Gaithersburg, MD (US);
Takao Naito, Tokyo (JP)

(73) Assignee: Fujitsu Limited, Kawasaki-shi (JP)

( * ) Notice: Subject to any disclaimer, the term of this patent is extended or adjusted under 35 U.S.C. 154(b) by 1163 days.

(21) Appl. No.: 12/956,710

(22) Filed: Nov. 30, 2010

(65) Prior Publication Data

US 2011/0223961 A1 Sep. 15, 2011

Related U.S. Application Data

(60) Provisional application No. 61/312,415, filed on Mar. 10, 2010.

(51) Int. Cl.
*H04B 7/00* (2006.01)
*H04B 7/02* (2006.01)
(Continued)

(52) U.S. Cl.
CPC .............. *H04B 7/022* (2013.01); *H04B 7/0615* (2013.01); *H04B 7/0617* (2013.01); *H04W 52/24* (2013.01);
(Continued)

(58) Field of Classification Search
CPC ........ H04B 7/022; H04B 7/04; H04B 7/0426; H04B 7/0465; H04B 7/0486; H04B 7/155; H04B 7/15528; H04B 7/15535; H04W 52/42; H04W 52/241; H04W 52/242; H04W 52/243; H04W 52/244; H04W 52/30; H04W 52/346; H04W 52/386; H04W 24/02; H04W 88/085

USPC ..................... 455/13.4, 16, 115.1, 127.2, 522; 370/315, 318, 328
See application file for complete search history.

(56) References Cited

U.S. PATENT DOCUMENTS 4,916,460 A 4/1990 Powell
5,371,734 A 12/1994 Fischer
(Continued)

FOREIGN PATENT DOCUMENTS

CN 1883217 A 12/2006
CN 1926782 3/2007
(Continued)

OTHER PUBLICATIONS

PCT Notification of Transmittal of the International Search Report and the Written Opinion of the International Searching Authority, or the Declaration mailed Oct. 18, 2011 regarding PCT/US2011/031666.
(Continued)

*Primary Examiner* — Duc M Nguyen
(74) *Attorney, Agent, or Firm* — Baker Botts L.L.P.

(57) ABSTRACT

In accordance with particular embodiments, a method for adjusting power distribution includes establishing a connection between a base station and a plurality of remote transceivers. The method also includes establishing a plurality of wireless connections with a plurality of endpoints via one or more of the plurality of remote transceivers. The method further includes determining a plurality of signal quality indications. Each signal quality indication is associated with a different one of a plurality of unique endpoint-remote transceiver pairs. The method additionally includes determining a power distribution for the plurality of remote transceivers based on the plurality of signal quality indications and an optimization equation. The optimization equation is configured to optimize a data throughput associated with the plurality of wireless connections by determining a power gain for each of the wireless connections.

15 Claims, 3 Drawing Sheets

(51) Int. Cl.
*H04B 7/06* (2006.01)
*H04W 52/24* (2009.01)
*H04W 52/26* (2009.01)
*H04W 52/40* (2009.01)
*H04W 52/14* (2009.01)
*H04W 52/38* (2009.01)
*H04B 7/155* (2006.01)
*H04W 88/08* (2009.01)

(52) U.S. Cl.
CPC .......... *H04W 52/241* (2013.01); *H04W 52/267* (2013.01); *H04W 52/40* (2013.01); *H04B 7/15535* (2013.01); *H04W 52/143* (2013.01); *H04W 52/386* (2013.01); *H04W 88/085* (2013.01); *Y02B 60/50* (2013.01)

(56) References Cited

U.S. PATENT DOCUMENTS

| | | | |
|---|---|---|---|
| 5,479,400 | A | 12/1995 | Dilworth et al. |
| 5,566,209 | A * | 10/1996 | Forssen et al. .................. 375/262 |
| 5,867,491 | A | 2/1999 | Derango et al. |
| 5,953,325 | A | 9/1999 | Willars |
| 6,070,071 | A * | 5/2000 | Chavez et al. ............. 455/422.1 |
| 6,341,214 | B2 | 1/2002 | Uesugi |
| 6,801,767 | B1 | 10/2004 | Schwartz et al. |
| 7,020,436 | B2 | 3/2006 | Schmutz |
| 7,062,224 | B2 * | 6/2006 | Baker et al. ........................ 455/9 |
| 7,313,113 | B1 | 12/2007 | Hills et al. |
| 7,519,323 | B2 * | 4/2009 | Mohebbi ...................... 455/11.1 |
| 7,574,230 | B1 * | 8/2009 | Oh et al. ........................ 455/522 |
| 7,639,984 | B2 * | 12/2009 | Uwano et al. ................. 455/63.1 |
| 8,078,100 | B2 * | 12/2011 | Proctor et al. ............... 455/11.1 |
| 8,174,428 | B2 | 5/2012 | Wegener |
| 8,175,004 | B2 * | 5/2012 | Chang et al. .................. 370/254 |
| 8,213,401 | B2 | 7/2012 | Fischer et al. |
| 8,428,653 | B2 * | 4/2013 | Li et al. ...................... 455/562.1 |
| 8,670,497 | B2 | 3/2014 | Grant et al. |
| 8,761,824 | B2 * | 6/2014 | Palanki et al. ............... 455/522 |
| 8,774,019 | B2 * | 7/2014 | Ma et al. ....................... 370/252 |
| 8,792,933 | B2 | 7/2014 | Chen |
| 2003/0043732 | A1 * | 3/2003 | Walton et al. ................. 370/208 |
| 2003/0119501 | A1 | 6/2003 | Kim |
| 2003/0123401 | A1 | 7/2003 | Dean |
| 2003/0220075 | A1 * | 11/2003 | Baker et al. ..................... 455/17 |
| 2004/0228283 | A1 * | 11/2004 | Naguib et al. ................. 370/252 |
| 2005/0105534 | A1 | 5/2005 | Osterling |
| 2005/0157675 | A1 | 7/2005 | Feder et al. |
| 2006/0116155 | A1 * | 6/2006 | Medvedev et al. ........... 455/522 |
| 2006/0195883 | A1 * | 8/2006 | Proctor et al. ................. 725/127 |
| 2006/0209752 | A1 | 9/2006 | Wijngaarden et al. |
| 2006/0217158 | A1 * | 9/2006 | Uwano et al. .............. 455/562.1 |
| 2007/0019679 | A1 | 1/2007 | Scheck |
| 2007/0041464 | A1 | 2/2007 | Kim et al. |
| 2007/0097945 | A1 * | 5/2007 | Wang et al. .................. 370/349 |
| 2007/0155314 | A1 * | 7/2007 | Mohebbi ...................... 455/11.1 |
| 2007/0195907 | A1 * | 8/2007 | Wang et al. .................. 375/267 |
| 2008/0102872 | A1 | 5/2008 | Liu |
| 2008/0159217 | A1 * | 7/2008 | Chang et al. ................. 370/329 |
| 2008/0293446 | A1 | 11/2008 | Rofougaran |
| 2009/0061939 | A1 * | 3/2009 | Andersson et al. ........ 455/562.1 |
| 2009/0135966 | A1 | 5/2009 | Fischer et al. |
| 2009/0170437 | A1 | 7/2009 | Bhattad et al. |
| 2009/0202020 | A1 * | 8/2009 | Hafeez .......................... 375/299 |
| 2009/0252108 | A1 | 10/2009 | Watanabe |
| 2009/0303918 | A1 * | 12/2009 | Ma et al. ....................... 370/315 |
| 2009/0325626 | A1 * | 12/2009 | Palanki et al. ............... 455/522 |
| 2010/0009625 | A1 * | 1/2010 | Chami et al. ................. 455/11.1 |
| 2010/0020757 | A1 * | 1/2010 | Walton et al. ................. 370/329 |
| 2010/0035600 | A1 | 2/2010 | Hou et al. |
| 2010/0265842 | A1 * | 10/2010 | Khandekar et al. .......... 370/252 |
| 2011/0026630 | A1 * | 2/2011 | Stager et al. .................. 375/267 |
| 2011/0034175 | A1 * | 2/2011 | Fong et al. .................... 455/450 |
| 2011/0189999 | A1 | 8/2011 | Mueck |
| 2011/0222434 | A1 | 9/2011 | Chen |
| 2011/0223958 | A1 * | 9/2011 | Chen et al. .................... 455/522 |
| 2011/0223960 | A1 | 9/2011 | Chen et al. |
| 2011/0244914 | A1 * | 10/2011 | Venkatraman et al. ....... 455/522 |
| 2012/0069882 | A1 | 3/2012 | Nino et al. |
| 2012/0163179 | A1 | 6/2012 | Jo et al. |
| 2012/0214550 | A1 | 8/2012 | Galaro et al. |
| 2012/0220214 | A1 | 8/2012 | Du et al. |
| 2012/0309349 | A1 | 12/2012 | Schmidt et al. |
| 2013/0058390 | A1 * | 3/2013 | Haas et al. .................... 375/224 |
| 2013/0150046 | A1 | 6/2013 | Gogic et al. |

FOREIGN PATENT DOCUMENTS

| | | |
|---|---|---|
| CN | 101321007 A | 12/2008 |
| CN | 101483456 A | 7/2009 |
| JP | H09-232848 | 9/1997 |
| JP | 2004260446 | 9/2004 |
| JP | 2004357325 | 12/2004 |
| JP | 2007-533178 | 11/2007 |
| JP | 2009-290406 | 12/2009 |
| JP | 2011-524117 | 8/2011 |
| WO | WO 2005/099121 | 10/2005 |
| WO | WO 2008/146394 | 12/2008 |
| WO | WO 2009/088328 | 7/2009 |
| WO | WO 2009/143176 | 11/2009 |

OTHER PUBLICATIONS

Office Action Summary received from the USPTO for U.S. Appl. No. 12/879,884, filed Sep. 10, 2010 for Wei-Peng Chen, Jan. 27, 2014.

PCT Notification of Transmittal of the International Search Report and the Written Opinion of the International Searching Authority, or the Declaration mailed May 31, 2011 re PCT/US2011/026405 filed Feb. 28, 2011.

PCT Notification of Transmittal of the International Search Report and the Written Opinion of the International Searching Authority, or the Declaration mailed Jun. 7, 2011 re PCT/US2011/027332 filed Mar. 7, 2011.

PCT Notification of Transmittal of the International Search Report and the Written Opinion of the International Searching Authority, or the Declaration mailed Jun. 7, 2011 re PCT/US2011/027331 filed Mar. 7, 2011.

Chen et al., U.S. Appl. No. 12/879,884, filed Sep. 10, 2010, "System and Method for Implementing Power Distribution" patent application.

Chen et al., U.S. Appl. No. 12/909,151 filed Oct. 21, 2010, "System and Method for Implementing Power Distribution" patent application.

Chen et al., U.S. Appl. No. 12/884,377, filed Sep. 17, 2010, "System and Method for Implementing Power Distribution" patent application.

Chen et al., U.S. Appl. No. 13/020,640, filed Feb. 3, 2011, "Method and Apparatus for Deploying a Wireless Network" patent application.

PCT Invitation to Pay Additional Fees and, Where Applicable, Protest Fee, mailed Jul. 14, 2011 regarding PCT/US2011/031666.

Siavash M. Alamouti, "A Simple Transmit Diversity Technique for Wireless Communications," *IEEE Journal on Select Areas in Communications*, vol. 16, No. 8, Oct. 1998.

Liang Sun et al., "Analytical Performance of MIMO Multichannel Beamforming in the Presence of Unequal Power Cochannel Interference and Noise," *IEEE Transactions on Signal Processing*, vol. 57, No. 7, Jul. 2009.

Shidong Zhou et al., "Distributed Wireless Communication System: A New Architecture for Future Public Wireless Access," *IEEE Communications Magazine*, Mar. 2003.

Wei Feng et al., "Downlink Capacity of Distributed Antenna Systems in a Multi-Cell Environment," © 2009 IEEE.

Wan Choi, et al., "Downlink Performance and Capacity of Distributed Antenna Systems in a Multicell Environment," *IEEE Transactions on Wireless Communications*, vol. 6, No. 1, Jan. 2007.

David Tse et al., "Fundamentals of Wireless Communications," Aug. 13, 2004.

(56) References Cited

OTHER PUBLICATIONS

Daniel Perez Palomar et al., "Joint Tx-Rx Beamforming Design for Multicarrier MIMO Channels: A Unified Framework for Convex Optimization," *IEEE Transactions on Signal Processing*, vol. 51, No. 9, Sep. 2003.
Yue Rong et al., "Space-Time Power Schedule for Distributed MIMO Links without Instantaneous Channel State Information at the Transmitting Nodes," *IEEE Transactions on Signal Processing*, Feb. 2008.
3GPP TR 36.942 V9.2.0 (Dec. 2009) 3rd Generation Partnership Project; Technical Specification Group Radio Access Network; Evolved Universal Terrestrial Radio Access (E-UTRA); Radio Frequency (RF) System Scenarios; (Release 9).
3GPP TR 36.300 V9.2.0 (Dec. 2009) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9).
CPRI Specification V4.1 (Feb. 18, 2009), Common Public Radio Interface (CPRI); Interface Specification.
Gerry Leavey, PMC-Sierra, "Enabling Distributed Base Station Architectures with CPRI," Issue No. 1, Feb. 2006.
"Distributed Antenna System," from Wikipedia, the free encyclopedia, downloaded from http://en.wikipedia.org/wiki/Distributed_Antenna_System, on Sep. 17, 2010.
Wei-Peng Chen, "System and Method for Implementing Power Distribution," U.S. Appl. No. 12/879,884, filed Sep. 10, 2010.
Wei-Peng Chen, "System and Method for Implementing Power Distribution," U.S. Appl. No. 12/909,151, filed Oct. 21, 2010.
Wei-Peng Chen, "System and Method for Implementing Power Distribution," U.S. Appl. No. 12/884,377, filed Sep. 17, 2010.
KIPO'S Notice of Preliminary Rejection for Korean Patent Application No. 10-2012-7023612 (English translation included), Jan. 13, 2014.
Chen, U.S. Appl. No. 13/020,640, U.S. Patent Office Summary, Apr. 22, 2013.
Chen, U.S. Appl. No. 13/020,640, U.S. Non-final Office Action, Jul. 11, 2013.
Chen, U.S. Appl. No. 12/879,884, U.S. Non=final Office Action, Aug. 12, 2013.
Korean Intellectual Property Office Notice of Preliminary Rejection for Korean Patent Application No. 10-2012-7026379, Oct. 30, 2013.
Notice of Allowance and Fee(s) Due issued by the USPTO for U.S. Appl. No. 13/020;640, filed Feb. 3, 2011, Mar. 14, 2014.
Notification of the first Office Action issued by the State Intellectual Property Office of People's Republic of China for Application No. or Patent No. 201180013026.4, Apr. 30, 2014.
Office Action Summary issued by the USPTO for U.S. Appl. No. 12/909,151 for Inventor: Wei-Peng Chen, May 6, 2014.
Notification of Reasons for Refusal for Japanese Patent Application No. 2011-051833 (includes English translation), mailing date Jun. 10, 2014.
State IP of Peoples Republic of China, Notification of the Text of the First Office Action and Search Report (with English translation), Appl. No. 201180012628.8 (PCT/US2011/027331) Issue Ser. No. 2014081201062120; assoc. ltr. dated Sep. 19, 2014, mailed Aug. 15, 2014.
U.S. Patent and Trademark Office, Final Office Action; Inventors: Pei-Weng Chen et al., U.S. Appl. No. 12/879,884, filed Sep. 10, 2010; Notification Date: Jul. 2, 2014.
U.S. Patent and Trademark Office, Final Office Action; Inventors: Pei-Weng Chen et al., U.S. Appl. No. 12/909,151, filed Oct. 21, 2010; Notification Date: Aug. 26, 2014.
U.S. Patent and Trademark Office, Non-Final Office Action; Inventors: Pei-Weng Chen et al., U.S. Appl. No. 12/879,884, filed Sep. 10, 2010; Notification Date: Oct. 20, 2014.
Wei-Peng Chen, U.S. Appl. No. 12/909,151, Advisory Action dated Nov. 10, 2014.
Wei-Peng Chen, U.S. Appl. No. 12/909,151, Advisory Action dated Dec. 5, 2014.
State Intellectual Property Office of PRC, Notification of the Second Office Action, Appln. 201180013026.4 dated Nov. 18, 2014 (English and Chinese versions)(25 pages).
Japanese Patent Office, Japanese Patent Application No. 2011-051833, Office Action regarding Decision to Refuse, mailing date Feb. 3, 2015.

\* cited by examiner

SYSTEM AND METHOD FOR IMPLEMENTING POWER DISTRIBUTION

RELATED APPLICATION

This application claims the benefit under 35 U.S.C. §119 (e) of U.S. Provisional Application Ser. No. 61/312,415, filed Mar. 10, 2010 and entitled "Method and System for Enhancing Capability of Distributed Antenna System."

TECHNICAL FIELD OF THE INVENTION

This invention relates in general to wireless networks and, more particularly, to a system and method for implementing power distribution.

BACKGROUND OF THE INVENTION

Distributed antenna systems consist of a base station (also known as a Radio Element Control or a Baseband Unit) and one or more remote transceivers (also known as Radio Elements or Remote Radio Heads). These components provide endpoints with wireless network access. To aid the distributed antenna system in distinguishing between the various wireless transmissions to and from the various endpoints, each endpoint may have one or more unique subcarriers assigned thereto.

Within a distributed antenna system, the remote transceivers are distributed around different locations while being connected via a wired connection (e.g., optical fiber) to the base station. Wile there may be multiple remote transceivers, from the perspective of an endpoint there is only one entity, the base station. That is, each remote transceiver transmits essentially the same core data, and the endpoint combines multiple signals from multiple remote transceivers into a single communication.

The base station communicates with the remote transceivers using, for example, the Common Public Radio Interface (CPRI) standard. The CPRI standard allows in-phase/quadrature (I/Q) data to be transmitted from the base station to the remote transceivers. The remote transceivers use the I/Q data to form the transmissions that are sent to any endpoints connected thereto. The remote transceivers are also able to communicate with the base station using the CPRI standard. This allows the remote transceivers to relay data received from the endpoints and to communicate control information, such as signal quality, to the base station.

SUMMARY

In accordance with a particular embodiment, a method for adjusting power distribution includes establishing a connection between a base station and a plurality of remote transceivers. The method also includes establishing a plurality of wireless connections with a plurality of endpoints via one or more of the plurality of remote transceivers. The method further includes determining a plurality of signal quality indications. Each signal quality indication is associated with a different one of a plurality of unique endpoint-remote transceiver pairs. The method additionally includes determining a power distribution for the plurality of remote transceivers based on the plurality of signal quality indications and an optimization equation. The optimization equation is configured to optimize a data throughput associated with the plurality of wireless connections by determining a power gain for each of the wireless connections.

Technical advantages of particular embodiments may include providing power distribution to multiple remote transceivers that increases the data throughput associated with the wireless connections. Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION

Figure 1:
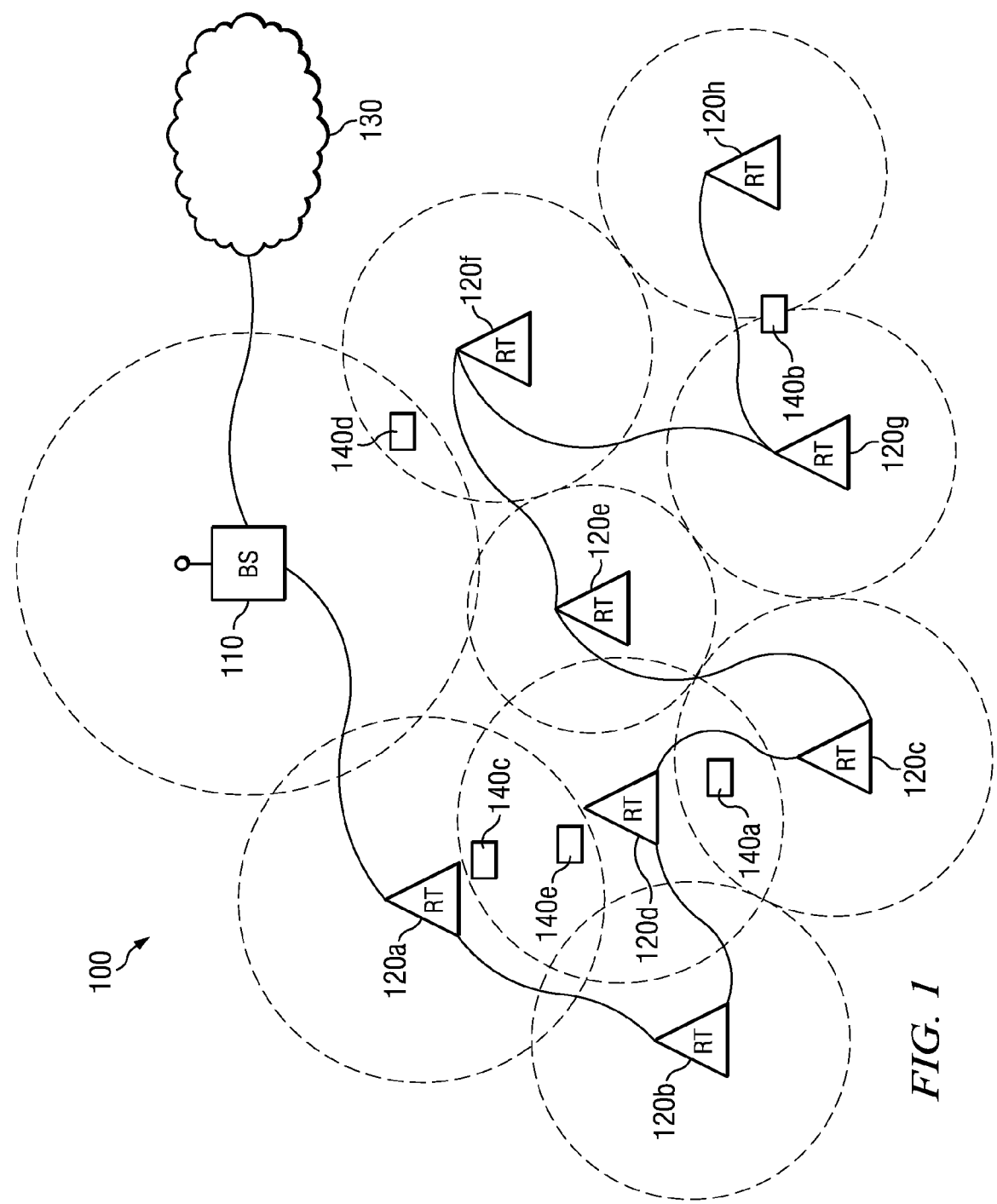
FIG. 1 illustrates a distributed antenna system comprising a base station and a plurality of remote transceivers, in accordance with a particular embodiment.

FIG. 1 illustrates a distributed antenna system comprising a base station and a plurality of remote transceivers, in accordance with a particular embodiment. Distributed antenna system 100 comprises base station 110 and multiple remote transceivers 120. Wireless communications may be transmitted by remote transceivers 120 at varying power levels. The power of a particular transmission, comprising one or more subcarriers, from a particular remote transceiver (e.g., remote transceiver 120*d*) to a particular endpoint (e.g., endpoint 140*c*) may depend on the signal quality between the particular endpoint and the particular remote transceiver. The transmission power of each subcarrier at each remote transceiver may be greater than or less than a standard power level. The standard power level may be based on an equal distribution of power among the subcarriers (e.g., all transmissions are transmitted with the same power). Increasing or decreasing the transmission power for each endpoint 140 at each remote transceiver 120 may increase the capacity of distributed antenna system 100 as compared to a system utilizing uniform power across all subcarriers.

Distributed antenna system 100 may be coupled to network 130 via base station 110. Distributed antenna system 100 provides wireless coverage for endpoints 140 over a large geographic area. For example, a single base station (e.g., base station 110) and a plurality of remote transceivers (e.g., remote transceivers 120) may be used to provide wireless coverage for an entire building. Because remote transceivers 120 are distributed over a geographical area, the distance between an endpoint and each remote transceiver 120 may be different. In particular embodiments, the signal quality between an endpoint and a remote transceiver may generally increase as the endpoint gets closer to the remote transceiver. Particular embodiments may take advantage of this increased signal quality by increasing the transmission power for the subcarriers associated with the signal having the better quality. Because a remote transceiver has a finite amount of transmission power, an increase in power for a particular subcarrier may be balanced by a corresponding decrease in power of another subcarrier. In certain embodiments, the power distribution calculated by base station 110 may increase the data throughput of the remote transceivers by distributing power Depending on the embodiment, distributed antenna system 100 may use any of a variety of wireless technologies or protocols (e.g., IEEE 802.16m or 802.16e, or long term evolution (LTE)) for communications between remote transceivers 120 and endpoints 140. The multiple remote transceivers 120 appear to endpoints 140 as a single entity—an extension of base station 110. Thus, each remote transceiver 120 may attempt to send the same core data to endpoints 140 and may potentially receive the same data from endpoints 140. The differences in the data that is sent or received may be the result of the respective distances of each remote transceiver 120 from a particular endpoint and, as will be discussed in more detail below, the amount of power applied to each subcarrier at each remote transceiver.

Depending on the embodiment, distributed antenna system 100 may use any of a variety of different wired technologies or protocols (e.g., CPRI) for communications between remote transceivers 120 and base station 110. In particular embodiments, base station 110 may be configured to adjust the power, either directly (e.g., incorporating the power distribution in the I/Q samples that are sent to the remote transceivers) or indirectly (e.g., providing power distribution values to each remote transceiver from which the remote transceivers can determine their respective power distribution), that each remote transceiver applies to its transmissions. By selectively increasing or decreasing the transmission power for particular subcarriers (associated with particular endpoints) at particular remote transceivers, base station 110 may be able to more efficiently use the available wireless resources.

Depending on the embodiment, base station 110 may use signal quality information from the various remote transceivers to determine the power distribution for each subcarrier for each remote transceiver 120. The signal quality information may include the received uplink power strength, the maximal usable modulation and coding scheme (MCS) level, the Carrier to Interference-plus-Noise Ratio (CINR) of the wireless connection. In particular embodiments, uplink sounding may be used to estimate the channel gain and interference strength between endpoints 140 and remote transceivers 120.

Network 130 may be any network or combination of networks capable of transmitting signals, data, and/or messages, including signals, data or messages transmitted through WebPages, e-mail, text chat, voice over IP (VoIP), and instant messaging. Network 130 may include one or more LANs, WANs, MANs, PSTNs, WiMAX networks, global distributed networks such as the Internet, Intranet, Extranet, or any other form of wireless or wired networking. Network 130 may use any of a variety of protocols for either wired or wireless communication.

Base station 110 may include any combination of hardware, software embedded in a computer readable medium, and/or encoded logic incorporated in hardware or otherwise stored (e.g., firmware) to implement any number of communication protocols that allow for the wireless exchange of packets in distributed antenna system 100. Base station 110 may be configured to determine and distribute a power distribution to each remote transceiver 120. Depending on the embodiment, base station 110 may apply the power distribution to the data before it is sent to the remote transceivers for transmission or base station 110 may send the power distribution to each remote transceiver to allow them to each individually apply the power distribution.

Remote transceivers 120 may include any combination of hardware, software embedded in a computer readable medium, and/or encoded logic incorporated in hardware or otherwise stored (e.g., firmware) to implement any number of communication protocols that allow for the wireless exchange of packets with endpoints 140 in distributed antenna system 100. In some embodiments, remote transceivers 120 receive data from base station 110 that may already include the power distribution determinations made by base station 110. In particular embodiments, each remote transceiver 120 may adjust the transmission power of the core data received from base station 110. In such an embodiment, each remote transceiver 120 receives the same core data and one or more control signals sent from base station 110 specifying the transmission power for each subcarrier, or plurality of subcarriers, at each respective remote transceiver 120. Remote transceivers 120 may then apply the power distribution to the core data before sending communications to endpoints 140.

Endpoints 140 may comprise any type of wireless device able to send and receive data and/or signals to and from base station 110 via remote transceivers 120. Some possible types of endpoints 140 may include desktop computers, PDAs, cell phones, smart phones, laptops, and/or VoIP phones. Endpoints 140 may provide data or network services to a user through any combination of hardware, software embedded in a computer readable medium, and/or encoded logic incorporated in hardware or otherwise stored (e.g., firmware). Endpoints 140 may also include unattended or automated systems, gateways, other intermediate components or other devices that can send or receive data and/or signals.

The following example may help illustrate particular features of certain embodiments. For purposes of this example, assume that base station 110 only controls two remote transceivers, remote transceivers 120*a* and 120*d*. Further assume that endpoints 140*c* and 140*e* are both located in the area served by remote transceivers 120*a* and 120*d*. To simplify the scenario, assume that the scheduling algorithm at base station 110 allocates the same number of subcarriers in a frame to each of endpoints 140*c* and 140*e*. Further assume that the magnitude of the channel gain between remote transceiver 120*a* and endpoint 140*c* is twice that of remote transceiver 120*a* and endpoint 140*e*; and that the magnitude of the channel gain between remote transceiver 120*d* and endpoint 140*e* is twice that of remote transceiver 120*d* and endpoint 140*c*. Then, based on these assumptions, base station 110 may allocate ⅔ of remote transceiver 120*a*'s power to the subcarriers used by endpoint 140*c* and ⅓ to the subcarriers used by endpoint 140*e* (as opposed to the even ½ and ½ distribution of a standard distributed antenna system). Similarly, base station 110 may allocate ⅔ of remote transceiver 120*d*'s power to the subcarriers used by endpoint 140*c* and ⅓ to the subcarriers used by endpoint 140*e*.

Although FIG. 1 illustrates a particular number and configuration of endpoints, connections, links, and nodes, distributed antenna system 100 contemplates any number or arrangement of such components for communicating data. In addition, elements of distributed antenna system 100 may include components centrally located (local) with respect to one another or distributed throughout distributed antenna system 100.

Figure 2:
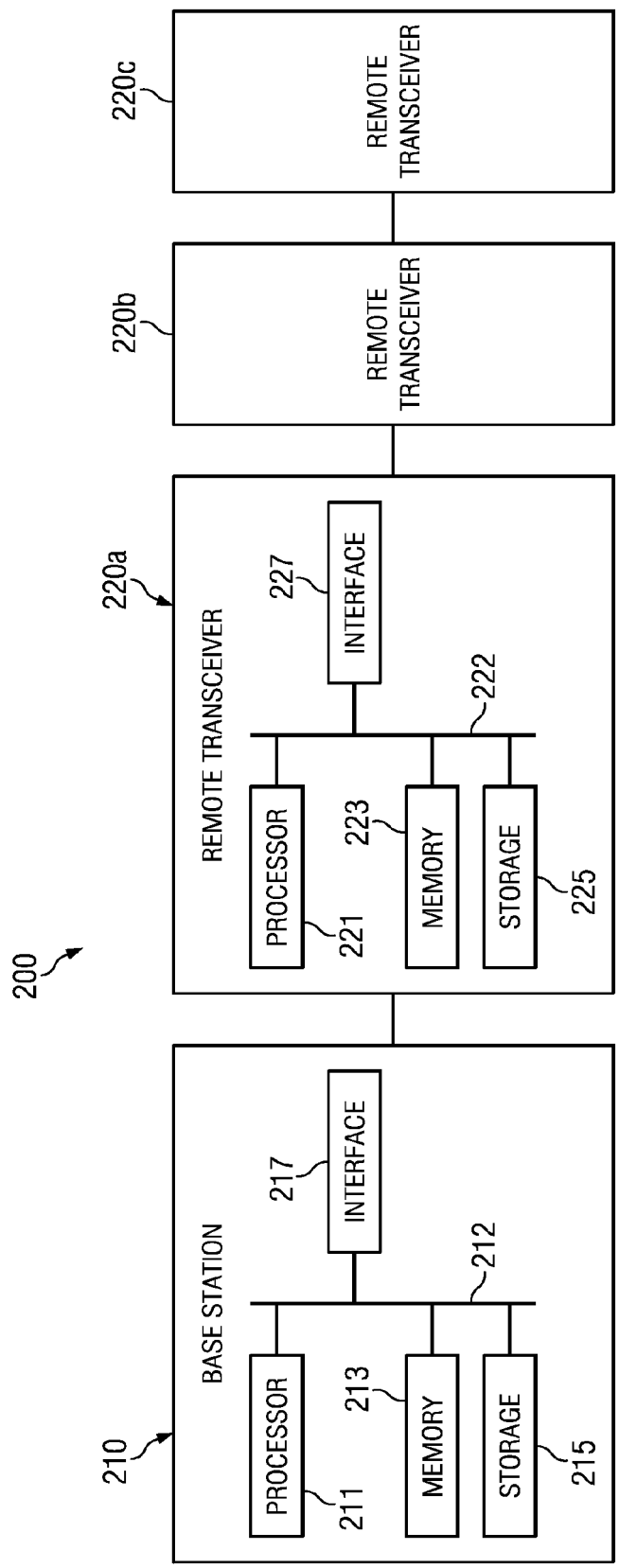
FIG. 2 illustrates a detailed block diagram of a base station and a remote transceiver within a distributed antenna system, in accordance with a particular embodiment.

FIG. 2 illustrates a detailed block diagram of a base station and a remote transceiver within a distributed antenna system, in accordance with a particular embodiment. Distributed antenna system 200 may be used with any of a variety of different wireless technologies, including, but not limited to, orthogonal frequency division multiple access (OFDMA), next generation wireless systems such as LTE-A and 802.16m.

Distributed antenna system 200 includes base station 210 and remote transceivers 220. Base station 210 and remote transceivers 220 may each include one or more portions of one or more computer systems. In particular embodiments, one or more of these computer systems may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of base station 210 and remote transceiver 220 may comprise any suitable physical form, configuration, number, type and/or layout. As an example, and not by way of limitation, base station 210 and/or remote transceiver 220 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, base station 210 and/or remote transceiver 220 may include one or more computer systems; be unitary or distributed; span multiple locations; span multiple machines; or reside in a cloud, which may include one or more cloud components in one or more networks.

Where appropriate, distributed antenna system 200 may perform without substantial spatial or temporal limitation one or more steps of one or more methods described or illustrated herein. As an example, and not by way of limitation, distributed antenna system 200 may perform in real time or in batch mode one or more steps of one or more methods described or illustrated herein. One or more distributed antenna systems may perform at different times or at different locations one or more steps of one or more methods described or illustrated herein, where appropriate.

In the depicted embodiment, base station 210 and remote transceiver 220 each include their own respective processors 211 and 221, memory 213 and 223, storage 215 and 225, interfaces 217 and 227, and buses 212 and 222. These components may work together to provide a distributed antenna system in which the power distribution for each endpoint at each remote transceiver 220 is distributed based on a relative signal quality for each endpoint at each remote transceiver. Although a particular distributed antenna system is depicted having a particular number of particular components in a particular arrangement, this disclosure contemplates any suitable distributed antenna system 200 having any suitable number of any suitable components in any suitable arrangement. For simplicity, similar components of base station 210 and remote transceiver 220 will be discussed together wherein the components of remote transceiver 220 will be identified in parenthesis. However, it is not necessary for both devices to have the same components, or the same type of components. For example, processor 211 may be a general purpose microprocessor and processor 221 may be an application specific integrated circuit (ASIC).

Processor 211 (and/or 221) may be a microprocessor, controller, or any other suitable computing device, resource, or combination of hardware, software and/or encoded logic operable to provide, either alone or in conjunction with other components, (e.g., memory 213 or 223, respectively) wireless networking functionality. Such functionality may include providing various wireless features discussed herein. For example, processor 211 may determine how to allocate power for each subcarrier at each remote transceiver 220. Additional examples and functionality provided, at least in part, by processor 211 (and/or 221) will be discussed below.

In particular embodiments, processor 211 (and/or 221) may include hardware for executing instructions, such as those making up a computer program. As an example and not by way of limitation, to execute instructions, processor 211 (and/or 221) may retrieve (or fetch) instructions from an internal register, an internal cache, memory 213 (and/or 223), or storage 215 (and/or 225); decode and execute them; and then write one or more results to an internal register, an internal cache, memory 213 (and/or 223), or storage 215 (and/or 225).

In particular embodiments, processor 211 (and/or 221) may include one or more internal caches for data, instructions, or addresses. This disclosure contemplates processor 211 (and/or 221) including any suitable number of any suitable internal caches, where appropriate. As an example and not by way of limitation, processor 211 (and/or 221) may include one or more instruction caches, one or more data caches, and one or more translation lookaside buffers (TLBs). Instructions in the instruction caches may be copies of instructions in memory 213 (and/or 223) or storage 215 (and/or 225) and the instruction caches may speed up retrieval of those instructions by processor 211 (and/or 221). Data in the data caches may be copies of data in memory 213 (and/or 223) or storage 215 (and/or 225) for instructions executing at processor 211 (and/or 221) to operate on; the results of previous instructions executed at processor 211 (and/or 221) for access by subsequent instructions executing at processor 211 (and/or 221), or for writing to memory 213 (and/or 223), or storage 215 (and/or 225); or other suitable data. The data caches may speed up read or write operations by processor 211 (and/or 221). The TLBs may speed up virtual-address translations for processor 211 (and/or 221). In particular embodiments, processor 211 (and/or 221) may include one or more internal registers for data, instructions, or addresses. Depending on the embodiment, processor 211 (and/or 221) may include any suitable number of any suitable internal registers, where appropriate. Where appropriate, processor 211 (and/or 221) may include one or more arithmetic logic units (ALUs); be a multi-core processor; include one or more processors 211 (and/or 221); or any other suitable processor.

Memory 213 (and/or 223) may be any form of volatile or non-volatile memory including, without limitation, magnetic media, optical media, random access memory (RAM), read-only memory (ROM), flash memory, removable media, or any other suitable local or remote memory component or components. Memory 213 (and/or 223) may store any suitable data or information utilized by base station 210 (and/or remote transceiver 220), including software embedded in a computer readable medium, and/or encoded logic incorporated in hardware or otherwise stored (e.g., firmware). In particular embodiments, memory 213 (and/or 223) may include main memory for storing instructions for processor 211 (and/or 221) to execute or data for processor 211 (and/or 221) to operate on. As an example and not by way of limitation, base station 210 may load instructions from storage 215 (and/or 225) or another source (such as, for example, another computer system, another base station, or a remote transceiver) to memory 213 (and/or 223). Processor 211 (and/or 221) may then load the instructions from memory 213 (and/or 223) to an internal register or internal cache. To execute the instructions, processor 211 (and/or 221) may retrieve the instructions from the internal register or internal cache and decode them. During or after execution of the instructions, processor 211 (and/or 221) may write one or more results (which may be intermediate or final results) to the internal register or internal cache. Processor 211 (and/or 221) may then write one or more of those results to memory 213 (and/or 223). In particular embodiments, processor 211 (and/or 221) may execute only instructions in one or more internal registers or internal caches or in memory 213 (and/or 223) (as opposed to storage 215 (and/or 225) or elsewhere) and may operate only on data in one or more internal registers or internal caches or in memory 213 (and/or 223) (as opposed to storage 215 (and/or 225) or elsewhere).

Bus 212 (and/or 222) may include any combination of hardware, software embedded in a computer readable medium, and/or encoded logic incorporated in hardware or otherwise stored (e.g., firmware) to couple components of base station 210 (and/or remote transceiver 220) to each other. As an example and not by way of limitation, bus 212 (and/or 222) may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212 (and/or 222) may include any number, type, and/or configuration of buses 212 (and/or 222), where appropriate. In particular embodiments, one or more buses 212 (which may each include an address bus and a data bus) may couple processor 211 (and/or 221) to memory 213 (and/or 223). Bus 212 (and/or 222) may include one or more memory buses, as described below.

In particular embodiments, one or more memory management units (MMUs) may reside between processor 211 (and/or 221) and memory 213 (and/or 223) and facilitate accesses to memory 213 (and/or 223) requested by processor 211 (and/or 221). In particular embodiments, memory 213 (and/or 223) may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 213 (and/or 223) may include one or more memories 213 (and/or 223), where appropriate.

In particular embodiments, storage 215 (and/or 225) may include mass storage for data or instructions. As an example and not by way of limitation, storage 215 (and/or 225) may include an HDD, a floppy disk drive, flash memory, an optical disc, a magneto-optical disc, magnetic tape, or a Universal Serial Bus (USB) drive or a combination of two or more of these. Storage 215 (and/or 225) may include removable or non-removable (or fixed) media, where appropriate. Storage 215 (and/or 225) may be internal or external to base station 210 (and/or remote transceiver 220), where appropriate. In particular embodiments, storage 215 (and/or 225) may be non-volatile, solid-state memory. In particular embodiments, storage 215 (and/or 225) may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 215 (and/or 225) may take any suitable physical form and may comprise any suitable number or type of storage. Storage 215 (and/or 225) may include one or more storage control units facilitating communication between processor 211 (and/or 221) and storage 215 (and/or 225), where appropriate.

In particular embodiments, interface 217 (and/or 227) may include hardware, encoded software, or both providing one or more interfaces for communication (such as, for example, packet-based communication) between base station 210, remote transceivers 220, any endpoints (not depicted) being serviced by base station 210, any networks, any network devices, and/or any other computer systems. As an example and not by way of limitation, communication interface 217 (and/or 227) may include a network interface controller (NIC) or network adapter for communicating with an Ethernet or other wire-based network and/or a wireless NIC (WNIC) or wireless adapter for communicating with a wireless network.

In some embodiments, interface 217 (and/or 227) may comprise one or more radios coupled to one or more antennas. In such an embodiment, interface 217 (and/or 227) may receive digital data that is to be sent out to wireless devices, such as endpoints, via a wireless connection. The radio may convert the digital data into a radio signal having the appropriate center frequency, bandwidth parameters, and transmission power. The power distribution for the radio signal may have been determined and applied to each subcarrier at base station 210, or the power distribution may be determined at base station 210 and applied by remote transceivers 220. Similarly, the radios may convert radio signals received via the antenna into digital data to be processed by, for example, processor 211 (and/or 221). In some embodiments, base station 210 may process the data by: Applying MRC to the individual incoming I/Q samples from each remote transceiver 220; determining the average received power of each subcarrier at each remote transceiver 220; allocating transmission power to each subcarrier for each remote transceiver 220; and perform power amplification and inverse fast Fourier transform on the data to be sent to the endpoints. In some embodiments, processing the data may comprise, at remote transceivers 220, determining the average received power for each subcarrier and combining the data from the endpoint with data from the same endpoint provided by an upstream remote transceiver. Then, at base station 210, a power distribution is determined for each subcarrier for each remote transceiver 220.

Depending on the embodiment, interface 217 (and/or 227) may be any type of interface suitable for any type of network for which distributed antenna system 200 is used. As an example and not by way of limitation, distributed antenna system 200 may communicate with an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, distributed antenna system 200 may communicate with a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. Base station 210 (and/or remote transceivers 220) may include any suitable interface 217 (and/or 227) for any one or more of these networks, where appropriate.

In some embodiments, interface 217 (and/or 227) may include one or more interfaces for one or more I/O devices. One or more of these I/O devices may enable communication between a person and base station 210 (and/or remote transceivers 220). As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 117 (and/or 227) for them. Where appropriate, interface 117 (and/or 227) may include one or more device or encoded software drivers enabling processor 211 (and/or 221) to drive one or more of these I/O devices. Interface 117 (and/or 227) may include one or more interfaces 117 (and/or 227), where appropriate.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

Particular embodiments may include one or more computer-readable storage media implementing any suitable storage. In particular embodiments, a computer-readable storage medium implements one or more portions of processor 211 (and/or 221) (such as, for example, one or more internal registers or caches), one or more portions of memory 213 (and/or 223), one or more portions of storage 215 (and/or 225), or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

The components and devices illustrated in FIG. 2 form distributed antenna system 200. From the perspective of an endpoint, distributed antenna system 200 may be perceived as a single base station. An endpoint may be unable to distinguish between a wireless transmission sent by a remote transceiver and a wireless transmission sent by a base station. The channel experienced by an endpoint is the sum of the channel responses from each of remote transceivers 220.

In particular embodiments, base station 210 may communicate with remote transceivers 220 using Common Public Radio Interface (CPRI). The CPRI specification supports a variety of topologies, including ring, tree, star, and chain topologies. Regardless of the topology, CPRI allows multiple remote transceivers 220 to be controlled by the same base station 210. In some embodiments, the CPRI link may be used by base station 210 to send/receive different in-phase/quadrature (I/Q) data to/from each different remote transceivers 220. For example, in some embodiments, base station 210 may apply power distribution locally to data before it is sent out to the remote transceivers. This may result in each remote transceiver receiving its own unique I/Q sample. In particular embodiments, the CPRI link may be used to send/receive a single set of I/Q samples to/from remote transceivers 220. For example, in some embodiments the power distribution may be applied individually at each respective remote transceiver. This may allow a single I/Q sample to be used by all remote transceivers 220 with each remote transceiver applying the power distribution locally.

In certain embodiments, before base station 210 allocates the power distribution, it may first execute a scheduling algorithm to allocate subcarriers within a channel to the different endpoints. Once the subcarriers have been assigned, base station 210 may use the measured uplink power received from remote transceivers 220 to redistribute the downlink power to maximize system capacity.

The allocation of power to different subcarriers at different remote transceivers 220 in the power distribution may be based on channel response information associated with each endpoint at each remote transceiver 220. In particular embodiments, base station 210 may, in general, allocate more power to those endpoints having better channel quality at each respective remote transceiver. This may result in an improved usage of transmission power which may increase the overall system capacity.

Depending on the embodiment, there may be at least three components used to determine channel response: path loss, shadowing, and multipath. In contrast with shadowing and multipath effects path loss is the most dominant component in the channel response. Accordingly, in some embodiments, the shadowing effect and/or multipath effect may be ignored to reduce the computational complexity of determining the power distribution. Path loss may be a function of the distance between an endpoint and a remote transceiver. The closer an endpoint is to a particular remote transceiver, the higher the channel gain is between the endpoint and the remote transceiver. In distributed antenna system 200, the varying distances between an endpoint and each remote transceiver 220 may result in varying path losses and channel gains between remote transceivers 220 and a particular endpoint.

In particular embodiments, the closer an endpoint is to a remote transceiver, the greater the power that will be allocated to the subcarriers associated with the endpoint at the respective remote transceiver. Conversely, the farther an endpoint is from a remote transceiver, the less power that will be allocated to subcarriers associated with the endpoint. This may allow each remote transceiver 220 to more efficiently use their available transmission power. The non-uniform power distribution to different subcarriers at different remote transceivers could enhance the signal to interference-plus-noise ratio (SINR) at the endpoint by increasing the received signal strength from the closer remote transceivers 220 while the loss of signal strength due to the reduced power from a more distant remote transceiver may be insignificant.

In particular embodiments, each remote transceiver 220 may measure the average received power of the subcarriers allocated to each endpoint. This information may then be delivered to base station 210 over a CPRI control channel. Base station 210 may use the measured uplink power to approximate the downlink channel response between each remote transceiver 220 and the endpoints. This estimation may be used by base station 210 to determine the power distribution which base station 210 may then send to remote transceivers 220 using the CPRI control channel.

In some embodiments, each remote transceiver 220 may send their own respective I/Q data to base station 210. Base station 210 may use the individual I/Q data samples to estimate the received downlink power at the endpoint (e.g., it may be proportional to the determined uplink power). Using this estimated power, base station 210 may determine and apply an amount of amplification or attenuation to the downlink signal. This may be done without adjusting the phase of the downlink signal. The amplified data may then be sent to remote transceivers 220 as individual I/Q data.

The determined power distribution, whether applied by remote transceivers 220 or base station 210, may amplify the downlink signal by a factor based on the magnitude of uplink power without adjusting phase. The power amplification may be expressed as $\sqrt{G_r(k)}$ for the subcarrier k sent by the r-th remote transceiver. The value of gain for each subcarrier at each remote transceiver 220 may be determined by solving an optimization problem to maximize system capacity. In some embodiments, the input data at base station 210 may be multiplied by power amplification gain before IFFT operation: $\tilde{X}_r[k] = \sqrt{G_r(k)} \cdot X[k]$. The received signal at an endpoint after performing an FFT operation may be expressed as:

$$Y[k] = \sum_{r=1}^{N_H} \sqrt{\frac{P_{r,k}}{N_T}} H_r(k) \cdot \sqrt{G_r(k)} X[k] + \sum_{i=1}^{N_I} \sqrt{\frac{P_{i,k}}{N_T}} H_i(k) \cdot \sqrt{G_i(k)} X_i[k] + N[k]$$

The corresponding frequency domain equalizer (FDE) at an endpoint may be:

$$FDE[k] = \Xi[k]^H = \sum_{r'=1}^{N_H} \sqrt{G_{r'}(k)} \cdot H_{r'}[k]^H.$$

In particular embodiments, the SINR of the proposed scheme may be:

$$SINR(k) = \frac{\sum_{r=1}^{N_H} \frac{P_{r,k}}{N_T} \cdot \left\| \Xi(k)^H \cdot \sqrt{G_r(k)} H_r(k) \right\|^2}{\sum_{i=1}^{N_I} \frac{P_{i,k}}{N_T} \cdot \left\| \Xi(k)^H \cdot \sqrt{G_i(k)} H_i(k) \right\|^2 + \|\Xi(k)\|^2 \cdot \sigma_n^2}$$

In certain embodiments, based on information theory, the system capacity of subcarrier k can be estimated as a function of SINR: $C(k) = \ln(1 + SINR(k))$. The objective of an optimization problem used to determine power distribution may be to determine the power amplification gain $\sqrt{G_r(k)}$ (or square of gain, $G_r(k)$) for the subcarriers of each endpoint-remote transceiver pair such that the overall system capacity is maximized (as compared to a system using a uniform distribution of power). The power gain applied to any one subcarrier cannot be amplified indefinitely since the total available transmission power a remote transceiver 220 is limited to a maximum available output power, $P_T$. Therefore, the constraint functions in the optimization problem are that the total transmission power from each remote transceiver 220 is less than or equal to $P_T$.

Besides $P_T$, the given inputs of the optimization problem may also include $P_{r,k}^{UL}$, which may be the received uplink power of the k-th subcarrier at remote transceiver r. As discussed above, in some embodiments the downlink received power at an endpoint may be assumed to be the same as (or proportional to) the uplink received power at the corresponding remote transceiver. $P_{r,k}^{UL}$ may be used as the downlink received power in the SINR formula above.

Based on the above, the capacity of the k-th subcarrier with $\sqrt{G_r(k)}$ power amplification may be expressed as:

$$C(k) = \ln \left( 1 + \frac{\sum_{r=1}^{N_H} \frac{P_{r,k}^{UL}}{N_T} \cdot \left\| \Xi(k)^H \cdot \sqrt{G_r(k)} H_r(k) \right\|^2}{\sum_{i=1}^{N_I} \frac{P_{i,k}^{UL}}{N_T} \cdot \left\| \Xi(k)^H \cdot \sqrt{G_i(k)} H_i(k) \right\|^2 + \|\Xi(k)\|^2 \cdot \sigma_n^2} \right)$$

In some embodiments, the optimization problem may be considered without inter-cell interference. This may simplify the problem to:

$$\max \sum_{k=1}^{N} c(k) = \sum_{k=1}^{N} \ln \left( 1 + \frac{\sum_{r=1}^{N_H} \frac{P_{r,k}^{UL}}{N_T} \cdot \left\| \Xi(k)^H \cdot \sqrt{G_{r,k}} H_r(k) \right\|^2}{\|\Xi(k)\|^2 \cdot \sigma_n^2} \right)$$

$$\text{s.t.} \sum_{k=1}^{N} G_{r,k} \cdot P_{r,k}^{TX} \le P_T \ \forall r = 1, \ldots, N_H$$

In particular embodiments the above mentioned objective and constraint functions may be further simplified by setting the power amplification gains for the subcarriers allocated to the same endpoint-remote transceiver pair to be approximately equal. This may be based on the assumption that the pathloss between a remote transceiver and an endpoint will not vary much between subcarriers. With this simplification, the number of variables, $G_r(k)$, in the optimization problem may be reduced from $N_H \cdot N$ to $N_H \cdot N_{UE}$ where $N_H$ is the number of remote transceivers, N is the number of points of FFT (Fast Fourier Transform) in a channel, and $N_{UE}$ is the number of endpoints that receive subcarrier allocation within one TTI (transmission time interval), the basic time unit for scheduling decisions at base station 210. In some embodiments and/or scenarios, before power amplification, a uniform power assignment may be set to all subcarriers such that $P_{i,k}^{TX} = P_T/N$. The constraint function can be simplified as: $\sum_{u=1}^{N_{UE}} G_{r,u} \cdot S_u \le N \ \forall r = 1, \ldots, N_H$ where $S_u$ is the number of subcarriers allocated to the u-th endpoint.

Another way in which the above mentioned objective and constraint functions may be simplified in particular embodiments is to assume $H_r(k)=1$ for all subcarriers. This may be equivalent to ignoring the effect of shadowing and multipath. An alternative method may be to compute the average uplink channel gain of the subcarriers assigned to the u-th endpoint UE.

In certain embodiments in which both of the above simplifications are applied, the optimization formulation may be become a non-linear programming problem which may be quickly solved:

$$\max \sum_{i=1}^{I} \sum_{u=1}^{N_{UE}} S_u \cdot \ln\left(1 + \frac{\sum_{r=1}^{N_H} \frac{c \cdot P_{r,u}^{UL}}{N_T} \cdot G_{r,u}^i}{\sum_{j=1}^{N_I} \frac{c \cdot P_{j,u}^{UL}}{N_T} \cdot G_{j,u}^i + \sigma_n^2}\right)$$

$$\text{s.t.} \sum_{u=1}^{N_{UE}} G_{r,u}^i \cdot S_u \leq N \ \forall \ i = 1, \ldots, I \text{ and } r = 1, \ldots, N_H$$

$$G_{r,u}^i \geq 0 \ \forall \ i = 1, \ldots, I; \ r = 1, \ldots, N_H, \text{ and } u = 1, \ldots, N_{UE}$$

In the above optimization formulation: (1) $S_u$ may represent the number of subcarriers allocated to the u-th end point; (2) $G_{r,u}$ ($=g_{r,u}^2$) may represent the square of the common power amplification factor at the r-th remote transceiver for all the subcarriers allocated to the u-th end point; (3) $P_{r,u}^{UL}$ may represent the average of the received uplink power of a subcarrier allocated to the u-th end point at the r-th remote transceiver; (4) c may represent a constant used to calibrate the differences between the transmitting and receiving antenna gains of downlink and uplink connections; (5) $N_T$ may represent the number of the transmitting antennas at each remote transceiver; (6) $N_H$ may represent the number of the remote transceivers controlled by a base station in a cell; (7) $N_{UE}$ may represent the number of end points that are scheduled in one TTI; (8) $N_I$ may represent the number of interference base stations; (9) $\sigma_n^2$ may represent the variance of the noise power per subcarrier; (10) N may represent the number of points of FFT in a channel, which may be the same as the number of subcarriers in a channel; and (11) the term of the log function, ln(.) may represent the average estimated per subcarrier capacity at the u-th end point. It may be the case that the symbols in the formulation above represent mostly given parameters, with $G_{r,u}$ ($r=1, \ldots, N_H$, and $u=1, \ldots, N_{UE}$) being the variables in the formulation.

The objective of the above formulation may be to maximize the overall system capacity. The system capacity may be based on the sum of the estimated capacity of all the end points connected to base station 210. The first set of constraint functions may limit the total transmission power at each remote transceiver to be less than or equal to a maximum transmission power, $P_T$. The constraint functions may be derived from the following inequality:

$$\Sigma_{k=1}^N G_{r,k} \cdot P_{r,k}^{TX} \leq P_T \ \forall \ r=1, \ldots, N_H$$

Where $P_{r,k}^{TX}$ is the power assigned to the k-th subcarrier of the r-th remote transceiver before the power amplification operation. In certain embodiments and/or scenarios, the power amplification of the subcarriers may initially be approximately equal thereby allowing $P_{r,k}^{TX}$ to be $P_T/N$. Moreover, in certain embodiments, as mentioned above, the power amplification gains for different subcarriers allocated to the same endpoint-remote transceiver pair may be approximately equal. This may allow the inequality to be simplified to the constraint functions in the optimization problem. The second set of constraint functions may ensure the positive or zero power amplification gains computed from the optimization problem.

In those embodiments in which inter-cell interferences within a total of I cells is considered, the optimization formulation may be:

$$\max \sum_{i=1}^{I} \sum_{k=1}^{N} c_i(k) =$$

$$\sum_{i=1}^{I} \sum_{k=1}^{N} \ln\left(1 + \frac{\sum_{r=1}^{N_H} \frac{P_{r,k}^{i\ UL}}{N_T} \cdot \left\|\Xi(k)^H \cdot \sqrt{G_{r,k}^i} H_r(k)\right\|^2}{\sum_{j=1}^{N_I} \frac{P_{j,k}^{i\ UL}}{N_T} \cdot \left\|\Xi(k)^H \cdot \sqrt{G_{j,k}^i} H_j(k)\right\|^2 + \|\Xi(k)\|^2 \cdot \sigma_n^2}\right)$$

$$\text{s.t.} \sum_{k=1}^{N} G_{r,k}^i \cdot P_{r,k}^{i\ TX} \leq P_T \ \forall \ i = 1, \ldots, I \text{ and } r = 1, \ldots, R$$

This may be simplified as:

$$\max \sum_{i=1}^{I} \sum_{u=1}^{N_{UE}} S_u \cdot \ln\left(1 + \frac{\sum_{r=1}^{N_H} \frac{P_{r,u}^{i\ UL}}{N_T} \cdot G_{r,u}^i}{\sum_{j=1}^{N_I} \frac{P_{j,u}^{i\ UL}}{N_T} \cdot G_{j,u}^i + \sigma_n^2}\right)$$

$$\text{s.t.} \sum_{u=1}^{N_{UE}} G_{r,u}^i \cdot S_u \leq N \ \forall \ i = 1, \ldots, I \text{ and } r = 1, \ldots, N_H$$

Once base station 210 has determined how to allocate the downlink power for the various subcarriers at each remote transceiver 220, the power distribution may be applied either at base station 210 or at remote transceivers 220. For example, in some embodiments, base station 210 may generate I/Q data for each remote transceiver 220 that includes the core data modified by the power distribution (this may be done in the frequency domain before base station 210 performs Inverse Discrete Fourier Transform (IDFT) operations). This may scale the data of frequency domain (before IDFT) up or down proportionally such that the total power of each remote transceiver does not exceed its capabilities.

In some embodiments, base station 210 may receive a combined uplink signal from remote transceivers 220. For example, remote transceiver 220c may send its received uplink signal to remote transceiver 220b. Remote transceiver 220b may combine its own received uplink signal with the uplink signal from remote transceiver 220c. The combined uplink signal may then be sent to remote transceiver 220a for remote transceiver 220a to combine with its received uplink signal. The combined uplink signal from all three remote transceivers may then be sent to base station 210. Accordingly, base station 210 may only receive one combined uplink I/Q sample and not individual I/Q samples from each remote transceiver 220.

In certain embodiments, base station 210 may enhance uplink capacity via Maximum Ratio Combining (MRC). This may be achieved, in part, by determining the received signal power of the subcarriers allocated to each endpoint. Base station 210 may further use MRC in processing each I/Q data sample sent from each of remote transceivers 220. This may improve the array gain associated with the multiple receiving entities of remote transceivers 220.

In particular embodiments, base station 210 may apply the power distribution to the core data, $g_r(k)=\sqrt{G_r(k)}$, before Inverse Fast Fourier Transform (IFFT) is applied. Both power amplification and IFFT may be done locally at base station 210. This may result in base station 210 sending different I/Q data to each remote transceiver 220. This may increase the data rate of the CPRI link. However, because base station 210 is sending different I/Q data specific to each remote transceiver 220, it may be possible to use standard remote transceivers without having to modify them to be able to make power adjustments based on a power distribution received from base station 210 via a control channel. In particular embodiments, the MRC, power amplification determination, FFTs (to process I/Q samples received from remote transceivers) and the IFFTs (to process I/Q samples to be sent to remote transceivers), may be performed by discrete modules designed specifically for each respective task. In some embodiments, one or more of these features may be performed by a combination of one or more of processor 211, memory 213, storage 215, bus 212 and interface 217.

In particular embodiments, each remote transceiver 220 may apply the power distribution and perform IFFT locally. This may allow base station 210 to send the same (frequency-domain) data to each remote transceiver 220. This may reduce the data rate needed for the CPRI link. In certain embodiments, in addition to the frequency domain I/Q data, base station 210 may also send the downlink scheduling information (e.g., the set of subchannels/subcarriers assigned to each endpoint in the transmission time interval (TTI)), and the power distribution for each endpoint. In particular embodiments, both pieces of information may be carried over the CPRI control session or CPRI control channel. The amount of data for both power amplification gain and scheduling information is much less compared to I/Q data.

In particular embodiments, each remote transceiver 220 may combine its own I/Q data with the I/Q data it receives from an upstream remote transceiver 220. The combined I/Q data may then be passed to the next remote transceiver downstream (towards base station 210). Because base station 210 receives only a single set of I/Q data based on the combination of the I/Q data from each of remote transceivers 220, base station 210 may not be able to use the received I/Q data to determine the power amplification distribution. However, in certain embodiments, remote transceivers 220 may compute the average received power from particular endpoints and send this information to base station 210 via a CPRI control signal. In some embodiments, computing the received power from an endpoint may include using scheduling information from base station 210. In particular embodiments, FFT operations may be performed at each remote transceiver 220 thereby relieving base station 210 of the task of performing FFT. In some embodiments, remote transceivers 220 may compute the average received power after FFT is conducted. In particular embodiments, remote transceivers 220 may comprise one or more discrete hardware modules for computing the average received power and/or performing the FFT. In particular embodiments, these tasks may be performed by a combination of processor 221, memory 223, storage 225 and/or interface 227.

Thus far, several different embodiments and features have been presented. Particular embodiments may combine one or more of these features depending on operational needs and/or component limitations. This may allow for great adaptability of distributed antenna system 200 to the needs of various organizations and users. Some embodiments may include additional features.

Figure 3:
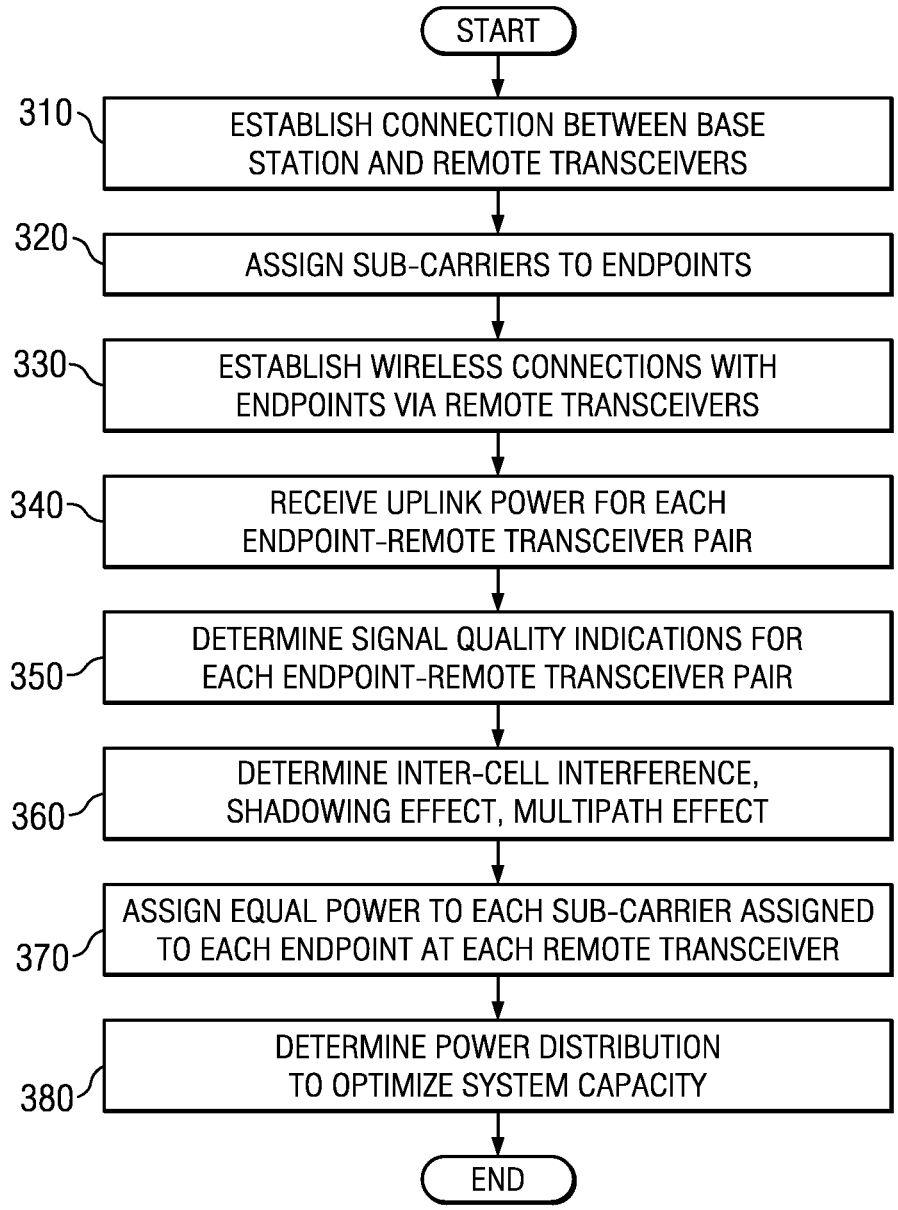
FIG. 3 illustrates a method for implementing power distribution, in accordance with a particular embodiment.

FIG. 3 illustrates a method for implementing power distribution, in accordance with a particular embodiment. The method begins at step 310 where a connection between a base station and a plurality of remote transceivers is established. In some embodiments, the connection between the base station and the plurality of remote transceivers may comprise a Common Public Radio Interface connection. In particular embodiments, the plurality of remote transceivers may be arranged in a cascaded topology. The cascaded topology may allow data and/or communications to be relayed end-to-end by passing through each of the remote transceivers. In other embodiments, the plurality of remote transceivers may be arranged in a star, tree, or ring topology. Regardless of the configuration, the base station may be responsible for managing one or more parameters and/or data associated with each of the remote transceivers.

At step 320 one or more subcarriers are assigned to each of the plurality of endpoints. The base station may assign the subcarriers using any of a variety of methods. The subcarriers assigned to an endpoint are unique to the endpoint but not the remote transceivers. For example, two different remote transceivers would use the same subcarrier to communicate with a particular endpoint; whereas two different endpoints would use different subcarriers to communicate with a particular remote transceiver.

At step 330 a plurality of wireless connections are established with a plurality of endpoints. The wireless connections are established via one or more of the plurality of remote transceivers. Each wireless connection may comprise a number of unique endpoint-remote transceiver pairs. For example, if a wireless connection is established with an endpoint via two remote transceivers, then the wireless connection may comprise two unique endpoint-remote transceiver pairs. While each endpoint, from its perspective, may have established a single wireless connection with a single base station, each endpoint may actually be sending and receiving communications from a number of remote transceivers. When an endpoint receives multiple wireless signals from multiple remote transceivers, it may perform various techniques for deriving the core data from the multiple wireless signals. For example, in some embodiments an endpoint may combine two or more wireless signals from two or more remote transceivers (each wireless signal comprises a copy of the same core data).

At step 340 the uplink power for each endpoint-remote transceiver pair is received. The received uplink power may be indicative of the received signal strength from the respective endpoint as received by the respective remote transceiver for each unique endpoint-remote transceiver pair. Depending on the embodiment and/or configuration, the uplink power may be received on a CPRI control channel from each of the remote transceivers. For example, each remote transceiver may determine the uplink power it receives from each endpoint. This information may then be sent over the CPRI control channel. In some embodiments, the uplink power may be determined from the data and information sent from the remote transceivers over the CPRI data channel. For example, the remote transceivers may send the base station the signals received from the endpoints with little or no processing done to the received signals. The signal may be sent over the CPRI data channel for the base station to process.

At step 350 a signal quality indication is determined for each of the plurality of endpoint-remote transceiver pairs. Each signal quality indication is associated with a different one the unique endpoint-remote transceiver pairs. In this embodiment, the signal quality indication may be based on the received uplink power, however, in other embodiments the signal quality indication may be determined from other information from which the base station may be able to determine the relative quality, strength, and/or efficiency of a wireless connection for each endpoint-remote transceiver pair.

At step 360 the inter-cell interference, shadowing effect, and multipath effect are determined. These determinations may increase the accuracy with which power is distributed among the endpoints at each of the remote transceivers. Some embodiments, in the interest of reducing the computational load on the base station, may only make two, one, or none of the determinations of step 360.

At step 370 an approximately equal amount of power is assumed to be assigned to each subcarrier assigned to each endpoint at each remote transceiver. This may have the effect of treating the subcarriers assigned to an endpoint as a single channel. This takes advantage of an assumption that there is little or no difference in the signal quality between the subcarriers that are assigned to a particular endpoint-remote transceiver pair. Thus, it may reduce the computational complexity of determining the power distribution by assuming that a particular remote transceiver will use the same power for all the subcarriers it uses for the wireless connection with a particular endpoint.

At step 380 a power distribution is determined that optimizes the system's capacity. The power distribution assigns power to the subcarriers used by the remote transceivers for the wireless connections with the endpoints. In certain embodiments, the better (e.g., stronger, clearer, more efficient) a wireless signal is between a remote transceiver and an endpoint, the greater the amount of power that will be distributed by the remote transceiver to use in communicating with the endpoint; conversely the worse a wireless signal is, the less power that will be distributed by the remote transceiver to use to communicate with the endpoint. In this embodiment, when the power distribution is determined, the base station takes into account, among other things, the plurality of signal quality indications (e.g., the received uplink power), the available transmission power associated with each of the plurality of remote transceivers, the determined inter-cell interference, the determined shadowing effect and the determined multipath effect. The various determinations and received data are applied to an optimization equation configured to optimize a data throughput associated with the plurality of wireless connections. The optimization equation may generate a power gain for each subcarrier of the wireless connections (in this embodiment, the subcarriers for a wireless connection associated with a particular endpoint-remote transceiver pair are assumed to all be approximately equal).

In certain embodiments, once the base station has made its determination for how each remote transceiver is to allocate power among the plurality of endpoints, the base station may encode the information into a control signal. The control signal may be transmitted to each remote transceiver, either globally or individually. The base station may then transmit a global data signal. The remote transceivers may modify the data based on the power distribution received in the control signal. This may result in each remote transceiver transmitting a different signal.

In some embodiments, once the base station has determined the power distribution it may apply the power distribution to the data before it is sent to the remote transceivers for broadcast to the endpoints. Each remote transceiver may be given a different data signal for which includes the appropriate power distribution has already been applied. The remote transceivers may then simply transmit the received data without having to make any modifications to the data based on the power distribution (e.g., the base station has already done the modifying).

Some of the steps illustrated in FIG. 3 may be combined, modified or deleted where appropriate, and additional steps may also be added to the flowchart. For example, in some embodiments, one or more of the inter-cell interference, shadowing effect and multipath effect may not be determined. Additionally, steps may be performed in any suitable order without departing from the scope of particular embodiments.

While various implementations and features are discussed with respect to multiple embodiments, it should be understood that such implementations and features may be combined in various embodiments. For example, features and functionality discussed with respect to a particular figure, such as FIG. 2, may be used in connection with features and functionality discussed with respect to another such figure, such as FIG. 1, according to operational needs or desires.

Although particular embodiments have been described in detail, it should be understood that various other changes, substitutions, and alterations may be made hereto without departing from the spirit and scope of particular embodiments. For example, although an embodiment has been described with reference to a number of elements included within distributed antenna system 100 such as endpoints, base stations and remote transceivers, these elements may be combined, rearranged or positioned in order to accommodate particular routing architectures or needs. In addition, any of these elements may be provided as separate external components to distributed antenna system 100 or each other where appropriate. Particular embodiments contemplate great flexibility in the arrangement of these elements as well as their internal components.

Numerous other changes, substitutions, variations, alterations and modifications may be ascertained by those skilled in the art and it is intended that particular embodiments encompass all such changes, substitutions, variations, alterations and modifications as falling within the spirit and scope of the appended claims.

What is claimed is:

1. A method for adjusting power distribution comprising:
   establishing a connection between a base station and a plurality of remote transceivers;
   wherein at least one of the plurality of remote transceivers is geographically remote from the base station;
   establishing a plurality of wireless connections with a plurality of endpoints via one or more of the plurality of remote transceivers;
   determining a plurality of signal quality indications, each signal quality indication associated with a different one of a plurality of unique endpoint-remote transceiver pairs;
   determining a power distribution for the plurality of remote transceivers based on the plurality of signal quality indications and an optimization equation configured to optimize a data throughput associated with the plurality of wireless connections by determining a power gain for each of the wireless connections;
   wherein determining a plurality of signal quality indications comprises:

receiving an uplink power associated with each of the plurality of unique endpoint-remote transceiver pairs, the uplink power indicative of the received signal strength from the endpoint by the remote transceiver for each unique endpoint-remote transceiver pair; and determining the plurality of signal quality indications based on the received uplink power associated with each of the plurality of unique endpoint-remote transceiver pairs;

wherein establishing a plurality of wireless connections with a plurality of endpoints comprises assigning one or more subcarriers to each of the plurality of endpoints; and wherein determining the power distribution for the plurality of remote transceivers comprises determining a power gain for each of the subcarriers as transmitted by each of the remote transceivers.

2. The method of claim 1, wherein determining the power distribution is further based on a transmission power associated with each of the plurality of remote transceivers.

3. The method of claim 1, further comprising assigning an approximately equal amount of power to each of the subcarriers assigned to a first endpoint with respect to a first remote transceiver.

4. The method of claim 1:
further comprising determining an inter-cell interference; and
wherein determining the power distribution is further based on the determined inter-cell interference.

5. The method of claim 1, wherein at least one of the plurality of remote transceivers comprises a plurality of antennas.

6. One or more computer-readable non-transitory storage media embodying software that when executed by a processor is operable to:
establish a connection between a base station and a plurality of remote transceivers;
wherein at least one of the plurality of remote transceivers is geographically remote from the base station;
establish a plurality of wireless connections with a plurality of endpoints via one or more of the plurality of remote transceivers;
determine a plurality of signal quality indications, each signal quality indication associated with a different one of a plurality of unique endpoint-remote transceiver pairs;
determine a power distribution for the plurality of remote transceivers based on the plurality of signal quality indications and an optimization equation configured to optimize a data throughput associated with the plurality of wireless connections by determining a power gain for each of the wireless connections;
wherein the software that when executed by a processor is operable to determine a plurality of signal quality indications is further operable to:
receive an uplink power associated with each of the plurality of unique endpoint-remote transceiver pairs, the uplink power indicative of the received signal strength from the endpoint by the remote transceiver for each unique endpoint-remote transceiver pair; and
determine the plurality of signal quality indications based on the received uplink power associated with each of the plurality of unique endpoint-remote transceiver pairs;
wherein the software that when executed by a processor is operable to establish a plurality of wireless connections with a plurality of endpoints is operable to assign one or more subcarriers to each of the plurality of endpoints; and
wherein the software that when executed by a processor is operable to determine the power distribution for the plurality of remote transceivers is operable to determine a power gain for each of the subcarriers as transmitted by each of the remote transceivers.

7. The media of claim 6, wherein the software when executed by a process is further operable to determine the power distribution based on a transmission power associated with each of the plurality of remote transceivers.

8. The media of claim 6, wherein the software when executed by a process is further operable to assign an approximately equal amount of power to each of the subcarriers assigned to a first endpoint with respect to a first remote transceiver.

9. The media of claim 6:
wherein the software when executed by a process is further operable to determine an inter-cell interference; and
wherein the software when executed by a processor is further operable to determine the power distribution based on the determined inter-cell interference.

10. The media of claim 6, wherein at least one of the plurality of remote transceivers comprises a plurality of antennas.

11. A system for adjusting power distribution comprising:
an interface configured to:
establish a connection between a base station and a plurality of remote transceivers;
wherein at least one of the plurality of remote transceivers is geographically remote from the base station;
establish a plurality of wireless connections with a plurality of endpoints via one or more of the plurality of remote transceivers; and
a processor coupled to the interface and configured to:
determine a plurality of signal quality indications, each signal quality indication associated with a different one of a plurality of unique endpoint-remote transceiver pairs;
determine a power distribution for the plurality of remote transceivers based on the plurality of signal quality indications and an optimization equation configured to optimize a data throughput associated with the plurality of wireless connections by determining a power gain for each of the wireless connections;
wherein:
the interface is further configured to receive an uplink power associated with each of the plurality of unique endpoint-remote transceiver pairs, the uplink power indicative of the received signal strength from the endpoint by the remote transceiver for each unique endpoint-remote transceiver pair; and
the processor configured to determine a plurality of signal quality indications is further configured to determine the plurality of signal quality indications based on the received uplink power associated with each of the plurality of unique endpoint-remote transceiver pairs;
wherein the interface configured to establish a plurality of wireless connections with a plurality of endpoints is further configured to assign one or more subcarriers to each of the plurality of endpoints; and
wherein the processor configured to determine the power distribution for the plurality of remote transceivers is further configured to determine a power gain for each of the subcarriers as transmitted by each of the remote transceivers.

12. The system of claim 11, wherein the processor is further configured to determine the power distribution based on a transmission power associated with each of the plurality of remote transceivers.

13. The system of claim 11, wherein the processor is further configured to assign an approximately equal amount of power to each of the subcarriers assigned to a first endpoint with respect to a first remote transceiver.

14. The system of claim 11:
wherein the processor is further configured to determine an inter-cell interference; and
wherein the processor is further configured to determine the power distribution based on the determined inter-cell interference.

15. The system of claim 11, wherein at least one of the plurality of remote transceivers comprises a plurality of antennas.

* * * * *